Patented Dec. 26, 1922.

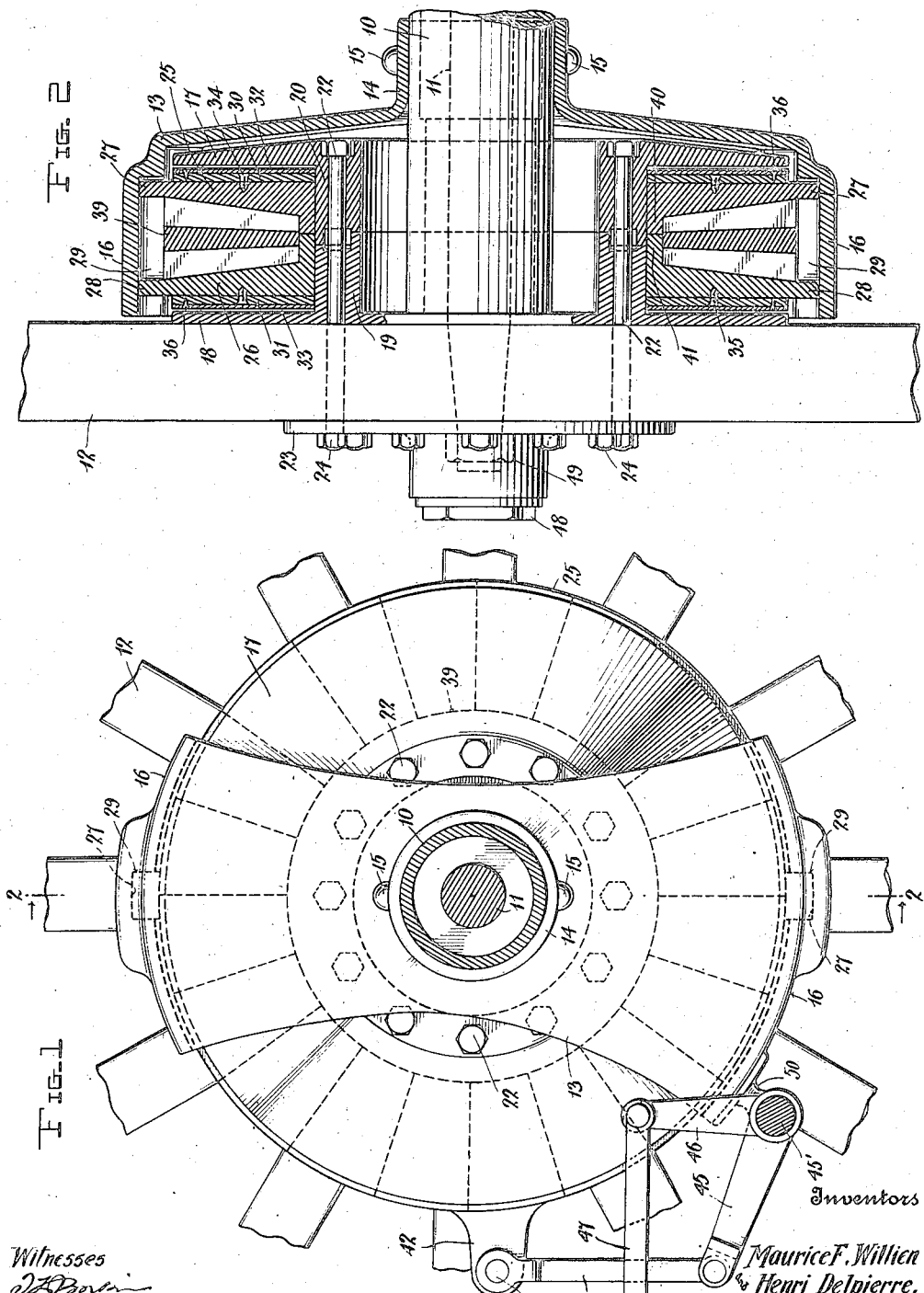

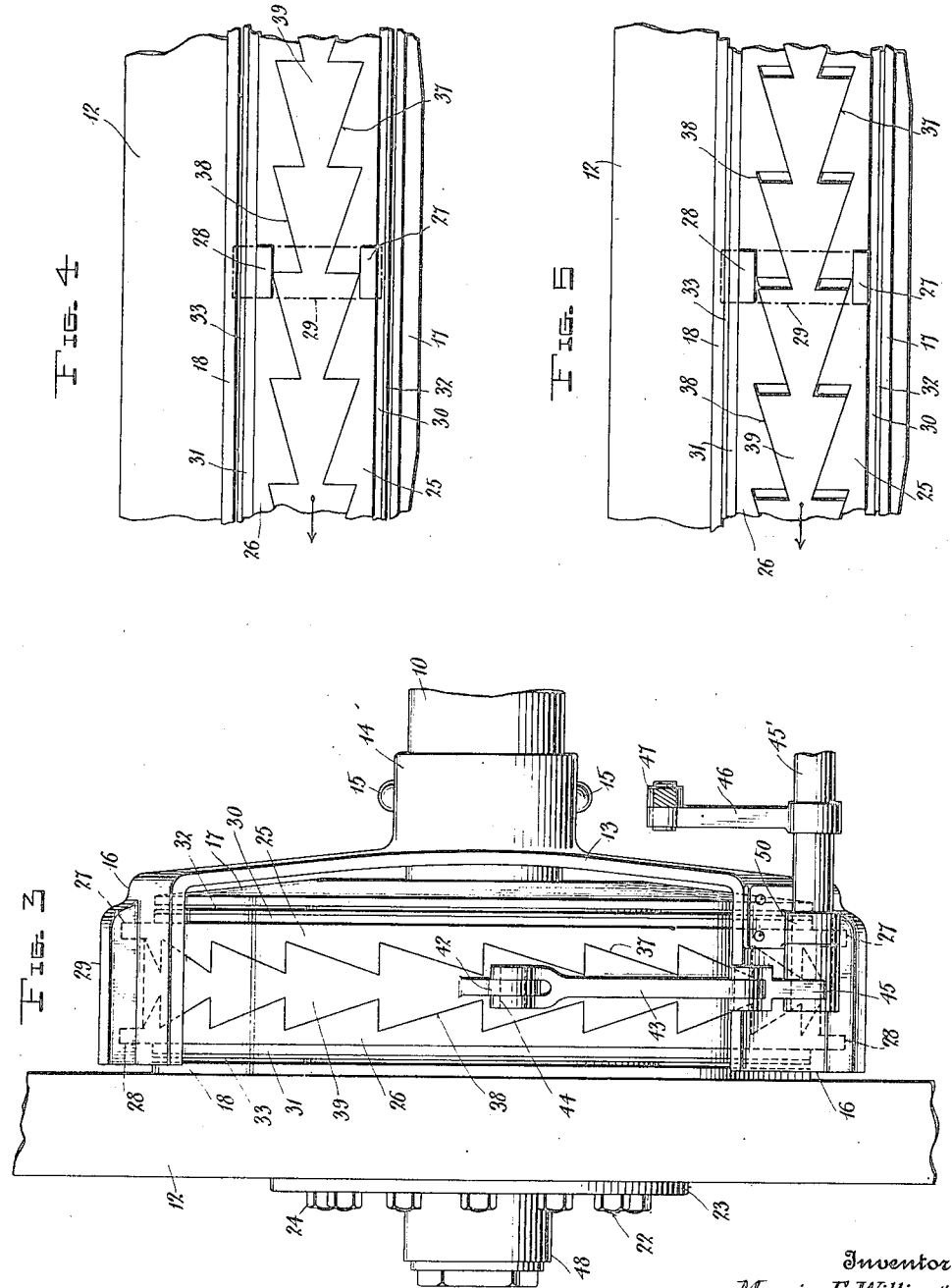

1,440,258

UNITED STATES PATENT OFFICE.

MAURICE FERNAND WILLIEN AND HENRI DELPIERRE, OF NEW YORK, N. Y.

EXPANDING BRAKE.

Application filed September 13, 1920. Serial No. 409,837.

*To all whom it may concern:*

Be it known that we, MAURICE FERNAND WILLIEN and HENRI DELPIERRE, citizens of the French Republic, residing at New York, in the county of New York and State of New York, have invented new and useful Improvements in Expanding Brakes, of which the following is a specification.

Our invention relates to a brake of the horizontally expanding type intended especially for use in connection with the driving wheels of a motor vehicle, but also capable of general application for applying a braking action to a rotating element.

Our improved brake provides vertical friction surfaces of large area whereby effective braking action may be obtained without undue wear on the contacting surfaces. By arranging the friction surfaces vertically it is possible to obtain contacting surfaces of large area without resorting to bulky or heavy construction.

Furthermore, our improved brake mechanism is composed of relatively few parts, which may be easily assembled and disassembled. The driving or rear wheel of the vehicle, however, may be removed from the axle without disturbing the operative parts of the brake mechanism.

Other objects of our invention will become apparent as the description proceeds. The description refers to the accompanying drawings illustrative of the preferred form of our invention, but it will be understood that it is our intention to include within the purview of our invention all departures from the illustrated embodiment which come within the scope of the claims appended to the specification.

In the drawings:—

Fig. 1 is a side elevation of our improved brake mechanism operatively assembled with the driving wheel.

Fig. 2 is a section on the line 2—2 of Figure 1 looking in the direction of the arrows.

Fig. 3 is a plan view of the brake mechanism in assembled position.

Fig. 4 is a plan view of a portion of the brake mechanism showing the operating disk in released position.

Fig. 5 is a plan view of a portion of the brake mechanism showing the operating disk in active position.

The numeral 10 designates the rear axle casing of a motor vehicle having the driving axle 11 rotatably mounted therein. A wheel 12 is keyed or otherwise rotatably secured to the rear axle 11. A drum 13 is provided with a hub portion 14 mounted on the axle housing 10 and secured thereto by means of rivets or other suitable fastening devices 15, and with a flange 16 which projects toward the wheel 12.

Two plates herein designated as 17 and 18 are provided with abutting hubs 19 and 20. These hubs are provided with longitudinal apertures which are adapted to align, and bolts 22 pass through these aligning apertures and through the spokes of the wheel 12 and spoke retaining plate 23 for receiving a nut 24 on their exposed threaded ends. The plates 17 and 18 are of such diameter as to fit within the flange 16 of the drum. Between the plates 17 and 18 are interposed two non-rotatable disks 25 and 26 each of which is provided with a key extension 27 and 28 adapted to engage elongated keyways 29 formed in the flanges 16 of the stationary drum. The disks 27 and 28 are thereby restrained from rotation, but may slide axially on the hubs 19 and 20. These disks are provided with flat vertical surfaces against which rings 30, 31 are adapted to bear, said rings being faced with friction material or brake lining 32, 33 which is respectively secured thereto by means of screws or rivets 36. The rings 30, 31 are secured to the plates 25, 26 respectively by screws 34, 35.

From this construction it will be apparent that the disks with the rings and brake lining secured thereto are restrained from rotary movement but may move axially into contact with the corresponding flat vertical surfaces of the plates 17 and 18, which latter rotate with the driving wheel 12. The disks 25 and 26 are also provided with a plurality of wedge shaped or cam surfaces 37, 38 which are adapted to coact with the corresponding surfaces of a disk 39 which is interposed between the disks 25, 26 and is adapted to oscillate on the hub portion 40, 41 of said disks in order to spread the same apart and force them axially into contact with the plates 17 and 18. The operating disk 39 has secured thereto an apertured ear 42 to which is pivoted a link 43 by means of a removable pin 44. The link 43 is connected to an arm 45 operatively connected to a brake shaft 45'. Another arm 46 secured to shaft 45' is pivotally connected to a rod 47 which connects a lever near the operator's seat of the vehicle so that the brake mechanism may be manually controlled from the front of the vehicle. The shaft 45' is journalled in bearings 50 attached at each side of the vehicle frame to the stationary drums 13.

It will be noted that in taking off the rear wheel 12, it is simply necessary to remove the pin 44, the dust cap 48 and the rear axle nut 49, when the rear wheel and the operating parts of the brake mechanism may be taken off as a unit. If it is desired to disassemble the operating parts of the brake mechanism, it is only necessary to unscrew the nuts 24, draw out the plate 18 and the disks 26, 39 and 27. If it is desired to replace the brake linings it is merely necessary to remove the screws 36 place a new lining on the rings 30, 31 and replace said screws in position.

In operation, assuming that the brakes are in normally released position and it is desired to apply the same, it is merely necessary to exert a pull on the rod 47 which actuates the double cam disk 39 downwardly, as shown in Figure 3, or in the direction of the arrows in Figures 4 and 5, and the wedge shaped teeth of this disk engaging the correspondingly shaped teeth of the disks 25 and 26, move the latter axially until the friction surfaces 32, 33 attached thereto engage respectively with the vertical surfaces of the plates 17, 18. The disks 25 and 26 are maintained stationary by the drum 13 while the plates 17 and 18 are rotating with the rear wheel and thereby the friction between said disks and plates tends to stop rotation of the wheel and consequently the movement of the vehicle, in an effective manner. From the above description it is apparent that we have provided a brake mechanism of simple and durable construction and one which may be easily and conveniently operated.

Having described our invention what we claim and desire to secure by Letters Patent, is:—

1. A brake for vehicles comprising in combination, an axle, a housing therefor, a drum fixed to said housing, a wheel removably supported by said axle, co-acting braking elements having vertical friction surfaces supported solely by said wheel and removable therewith, and means on said drum for holding one of said elements against rotation.

2. A brake for vehicles comprising in combination, an axle, a housing therefor, a drum fixed to said housing, a wheel removably supported by said axle, co-acting braking means having vertical friction surfaces supported solely by said wheel and removable therewith, and a key on said drum arranged parallel with the axis of said housing and slidably engaging a keyway in one of said elements to hold said element against rotation.

3. A brake for vehicles comprising a wheel, a divided hub arranged at one side of said wheel, comprising abutting hub portions each carrying a vertical friction plate at its remote end, a pair of friction disks mounted on said hub between said plates and co-actable respectively therewith, means on said disks engageable with means extraneous to said wheel to prevent rotation of said disks, cam means mounted on said hub for forcing said disks into co-action with said plates and means for securing the portions of said divided hub together.

4. A brake for vehicles comprising a wheel, a divided hub arranged at one side of said wheel comprising abutting hub portions each carrying a vertical friction plate at its remote end, a pair of friction disks mounted on said hub, between said plates and co-actable respectively therewith, means on said disks engageable with means extraneous to said wheel to prevent rotation of said disks, cam means mounted on said hub for forcing said disks into co-action with said plates and single means for securing the portions of said dividing hub together and to said wheel.

5. A brake for vehicles comprising the combination with a wheel, of plates secured thereto, said plates having oppositely projecting hubs adapted to abut and maintain said plates in spaced relation, and being provided with a vertical friction surface, cam disks mounted on said hubs each having a flat outside surface adapted to operatively engage the friction surface adjacent thereto, each cam disk being provided with a cam surface arranged peripherally around its inner edge, means for restraining said disks from rotation but permitting axial sliding movement on said hubs, and means having peripherally disposed cam surfaces on both sides thereof interposed between said disks engaging the cam surfaces of the latter for actuating the same in opposite directions and into contact with said friction surfaces.

In testimony whereof we have hereunto set our hands in presence of two subscribing witnesses.

MAURICE FERNAND WILLIEN.
HENRI DELPIERRE.

Witnesses:
   JOHN F. WRIGHT,
   CHARLES C. ROSIER.